US006822239B2

United States Patent
Tanimori et al.

(10) Patent No.: US 6,822,239 B2
(45) Date of Patent: Nov. 23, 2004

(54) CORPUSCULAR BEAM IMAGE DETECTOR USING GAS AMPLIFICATION BY PIXEL TYPE ELECTRODES

(75) Inventors: Toru Tanimori, Kyoto (JP); Atsuhiko Ochi, Kobe (JP)

(73) Assignee: Japan Science and Technology Corporation (JP)

( * ) Notice: Subject to any disclaimer, the term of this patent is extended or adjusted under 35 U.S.C. 154(b) by 223 days.

(21) Appl. No.: 10/069,237
(22) PCT Filed: Jun. 18, 2001
(86) PCT No.: PCT/JP01/05165
 § 371 (c)(1),
 (2), (4) Date: Feb. 22, 2002
(87) PCT Pub. No.: WO02/01249
 PCT Pub. Date: Jan. 3, 2002

(65) Prior Publication Data
 US 2002/0134945 A1 Sep. 26, 2002

(30) Foreign Application Priority Data
 Jun. 27, 2000 (JP) ......................... 2000-191994

(51) Int. Cl.$^7$ ................................. G01T 1/18
(52) U.S. Cl. .................................... 250/385.1
(58) Field of Search ....................... 250/385.1

(56) References Cited

U.S. PATENT DOCUMENTS

| 4,280,075 A | * | 7/1981 | Comby et al. ........... 250/385.1 |
| 5,742,061 A | * | 4/1998 | Lemonnier et al. ...... 250/385.1 |

FOREIGN PATENT DOCUMENTS

| JP | 9-508750 A | 9/1997 |
| JP | 10-300856 A | 11/1998 |

* cited by examiner

Primary Examiner—Constantine Hannaher
(74) Attorney, Agent, or Firm—Lorusso, Loud & Kelly

(57) ABSTRACT

A particle beam image detector employing gas amplification attained by pixel-type electrodes has high sensitivity and improved reliability of electrodes. Electrons $e^-$ produced through ionization of the gas move under the force of a drift field toward a pixel in the form of a columnar anode electrode. Avalanche amplification occurs in the vicinity of the columnar anode electrode due to a strong electric field between anode and cathode and the pointed shape of the electrode. The positive ions quickly drift toward strip-shaped cathode electrodes. Electric charges are generated on the columnar anode electrodes and also on the strip-shaped cathodes and these electric charges are observable to determine the anode or cathode strip at which this amplification phenomenon occurs and thus to obtain information as to position of the incident particle beam.

12 Claims, 4 Drawing Sheets

CORPUSCULAR BEAM IMAGE DETECTOR USING GAS AMPLIFICATION BY PIXEL TYPE ELECTRODES

TECHNICAL FIELD

The present invention relates to a particle beam image detector employing gas amplification attained by pixel-type electrodes.

BACKGROUND ART

The present inventors have previously developed an MSGC (Micro Strip Gas Chamber), which is a gas amplification-type particle beam image detector which provides high position resolution and high incident particle tolerance and which has strip-type electrodes. Characteristic features of this detector include a very short dead time for a gas amplifier and high position resolution, and the detector has attracted keen interest for its potential use as a detector for particle beams of high brightness. Presently, tests employing X-rays have confirmed that the detector is free of malfunction under a brightness of $10^7$ counts/mm²·second or more.

FIG. 1 is an exploded perspective view of a conventional MSGC.

The MSGC imaging device shown in FIG. 1 has an effective area of 10 cm×10 cm. Reference numeral 1 denotes a substrate made of a polyimide thin film. Reference numeral 2 denotes an anode strip formed on substrate 1, and reference numeral 3 denotes a strip-shaped cathode electrode. Anode strips 2 and strip-shaped cathode electrodes 3 are juxtaposed alternately.

Reference numeral 4 denotes a base substrate made of ceramic, and reference numeral 5 denotes a back-side electrode formed on the base substrate 4 and placed under the substrate 1.

At a distance approximately $D_1$ above the thus-constructed element is located a drift plate 6 to thereby define a chamber for allowing passage of gas therethrough; e.g., a gas containing argon and ethane (see, for example, Japanese patent Application Laid-Open (kokai) No. 10-300856).

DISCLOSURE OF THE INVENTION

One critical problem associated with the above-described MSGC is breakage of the electrodes resulting from discharge between the electrodes. In the case of the conventional MSGC, a voltage is applied between electrodes having a clearance of 50 μm or less. Therefore, when a high voltage is applied in the hope of increasing the gas amplification factor, a large current flows between the electrodes. As a result, it frequently occurs that heat generated from discharge destroys the electrode strips, or fragments of the broken electrode strips are deposited onto the surface insulating layer, resulting in malfunction of the device.

Moreover, since signals generated in the back-side electrodes 5, which are a two-dimensional read out, have a magnitude about 20% that of the signals generated by the anodes located on the surface side, an expensive amplifier must be employed in a circuit for attaining successful read-out of such weak signals, or alternatively, the amplification factor attained as gas amplification must be further improved.

In view of the foregoing, an object of the present invention is to provide a particle beam image detector employing gas amplification attained by pixel-type electrodes, the detector having high sensitivity and electrodes of improved reliability.

In order to achieve the above object, the present invention provides a particle beam image detector employing gas amplification attained by pixel-type electrodes, comprising anode strips formed on one surface of a substrate, columnar anode electrodes which are supported on the anode strips and penetrate the double-sided substrate so as to extend into apertures in the strip-shaped cathode electrodes. Each of the anode strips may have a width of about 200 to 400 μm.

The anode strips are provided at intervals of about 400 μm, the strip-shaped cathode electrodes each have apertures spaced a predetermined distance, the diameter of the aperture being about 200 to 300 μm, and each of the columnar anode electrodes has a diameter of about 40 to 60 μm and a height of about 50 to 150 μm.

DESCRIPTION OF THE PREFERRED EMBODIMENTS

Figure 1:
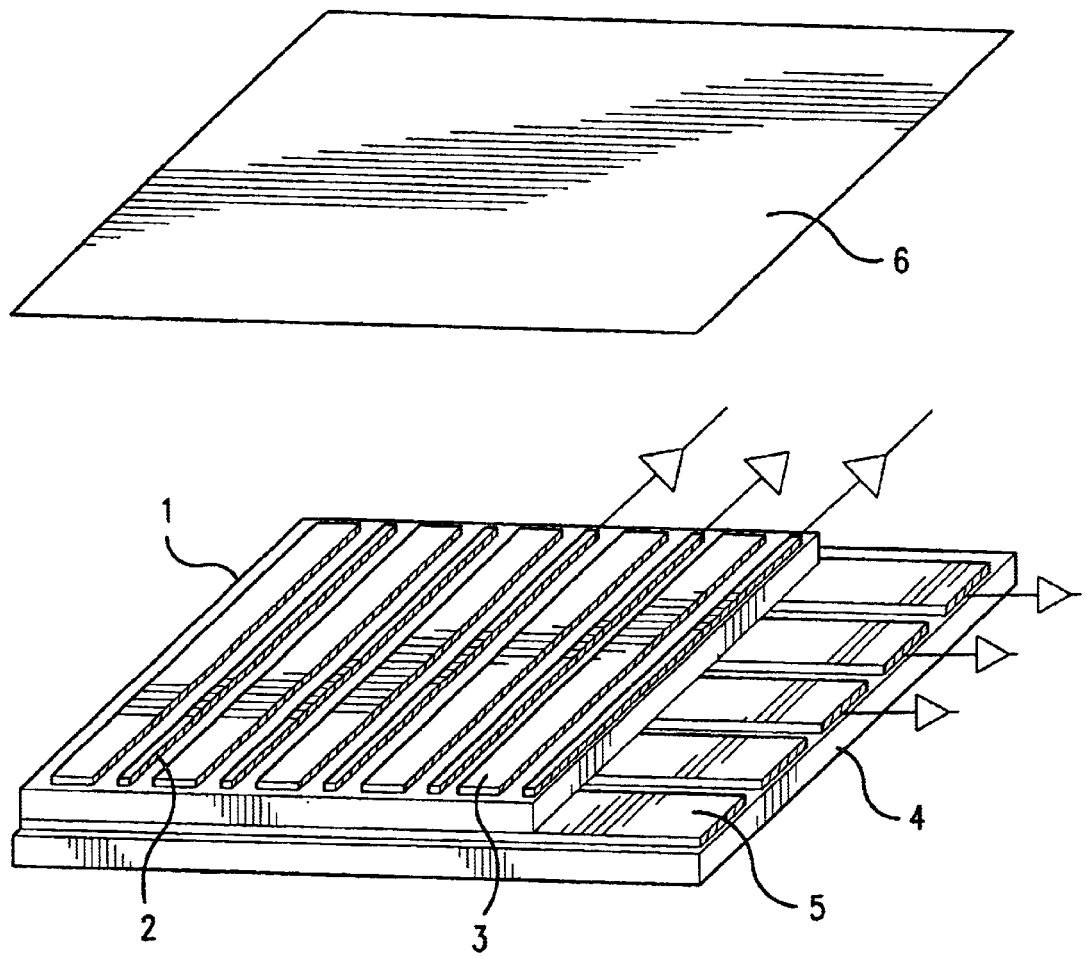
FIG. 1 is an exploded perspective view of a conventional MSGC.
Figure 2:
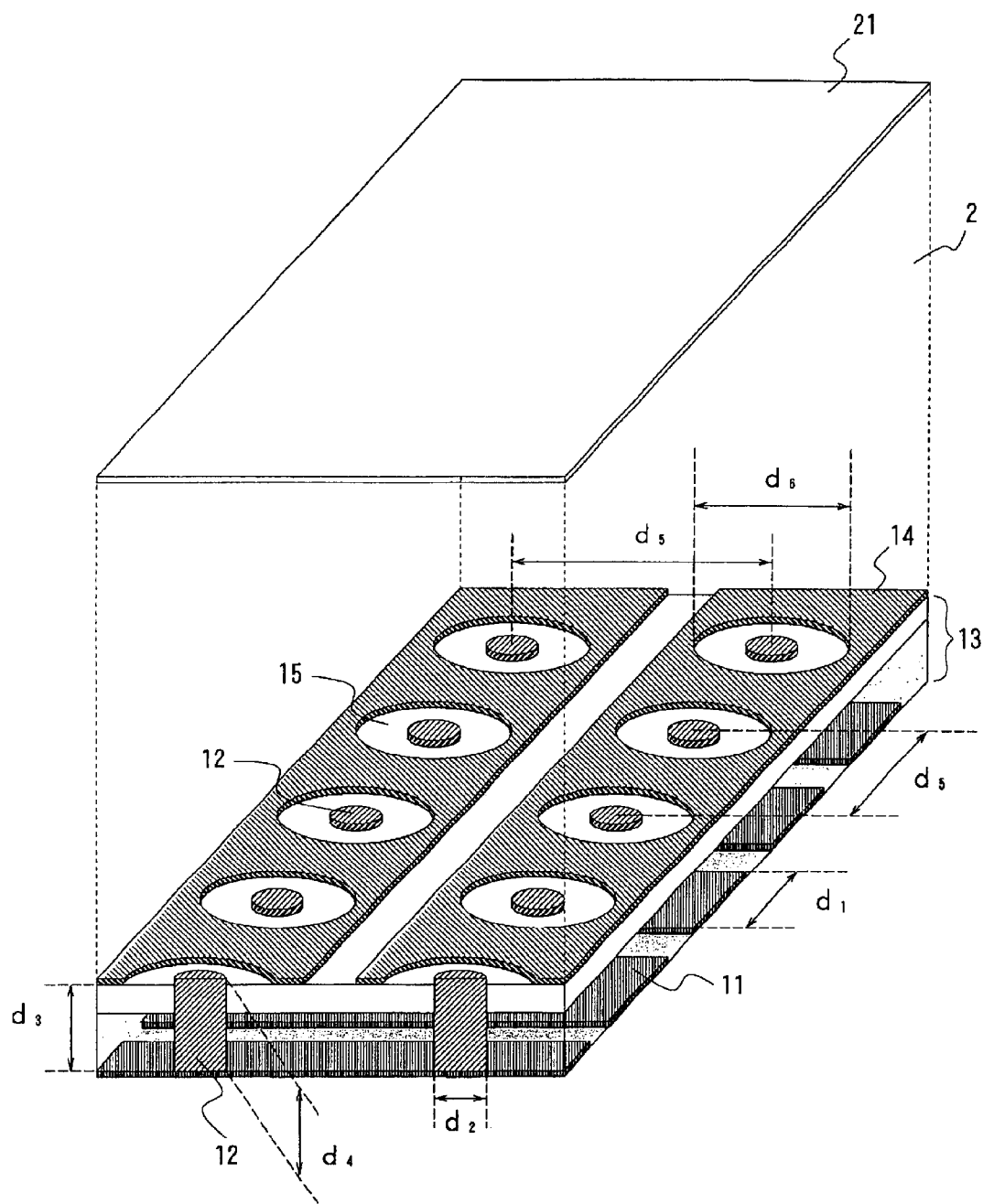
FIG. 2 is a perspective view showing an essential portion of a particle beam image detector employing gas amplification and having by pixel-type electrodes, according to one embodiment of the present invention.

In FIG. 2, for the sake of easy understanding of the disposition of the anode strips, the lower section of the double-sided printed substrate is depicted as separated from the upper section. However, it should be noted that the upper and lower sections are not separated, but constitute a unitary, double-sided substrate.

Figure 3:
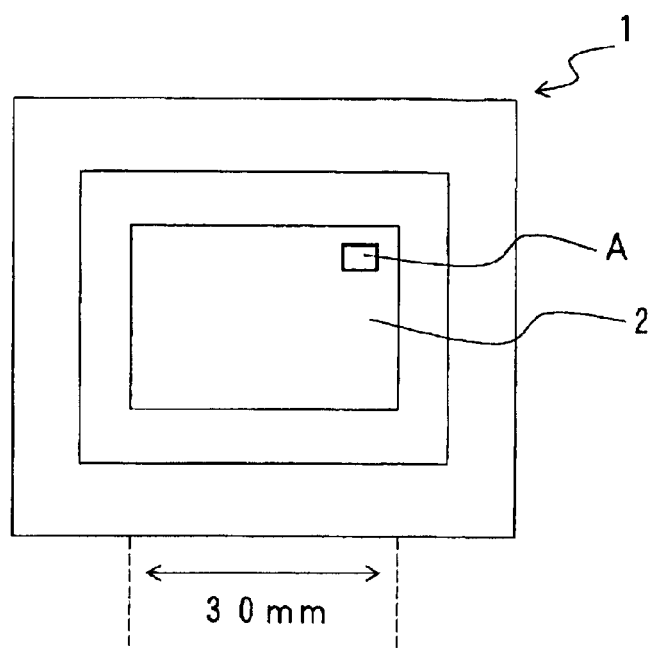
FIG. 3 is a plan view of the embodiment of the particle beam image detector shown in FIG. 2.
Figure 4:
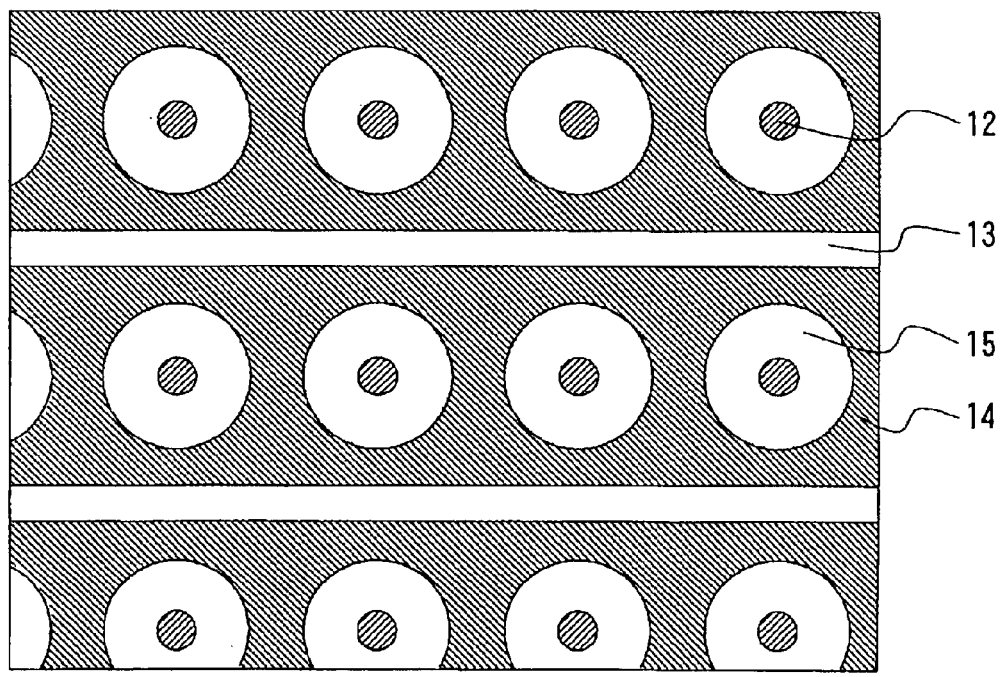
FIG. 4 is an enlarged view of the portion A indicated in FIG. 3.

In FIGS. 2–4, reference numeral 1 denotes a particle beam image detector, 2 a pixel chamber (300 mm×300 mm), 11 an anode strip (although width $d_1$ is 300 μm in the present embodiment, any width falling within the range of about 200 μm to 400 μm may be used), 12 a columnar anode electrode joined to and extending from the anode strip 11 (although the diameter $d_2$ is 50 μm, any diameter falling within the range of about 40 μm to 60 μm may be used), 13 a double-sided substrate for a printed circuit having a thickness $d_3$ of about 100 μm; 14 a strip-shaped cathode electrode formed on one planar surface of the substrate 13, and 21 a drift electrode.

As shown in FIG. 2, the particle beam image detector of the present invention includes a double-sided printed circuit substrate 13, strip-shaped cathode electrodes 14 on one surface of the substrate 13, and anode strips 11 on the back surface of the substrate 13. The anode strips 11 are provided with a centerline spacing $d_5$ of 400 μm. The strip-shaped cathode electrodes 14 each have apertures 15 arranged at predetermined intervals. At the center of each aperture 15 is provided a pixel in the form of a columnar anode electrode 12. The pixel is connected to a corresponding anode strip 11 present on the back side. The diameter $d_6$ of the aperture 15 in the strip-shaped cathode electrode 14 is 250 μm. However, the diameter is not limited thereto and may be any value falling within the range of 200 μm to 300 μm.

As described above, in the present embodiment, the pixels (anodes) 12 each have a diameter of 50 μm; however, the pixels may have a diameter of 40 μm to 60 μm. The anode electrodes 12 are of a cylindrical shape and have a height $d_4$ of about 100 μm, approximating the thickness of the double-sided printed substrate 13. However, the height of the anode electrodes is not so limited and may suitably be within a range of 50 μm to 150 μm, in accordance with the thickness of the double-sided printed substrate 13.

In actual use of the detector for detecting a particle beam, the double-sided printed substrate 13 is placed in a pixel chamber 2, i.e., in an inert-gas-based atmosphere. As shown in FIG. 2, a drift electrode 21 is provided at an appropriate spacing from the substrate 13 (in practice, spaced several mm to several cm from the substrate 13) and parallel to the detector. This arrangement allows image measurement of radioactive rays similar to that attained by the MSGC.

Figure 5:
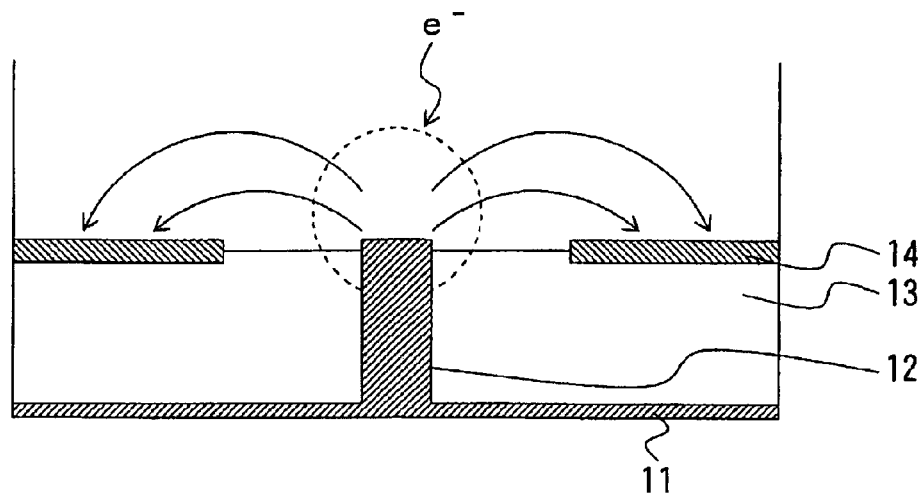
FIG. 5 illustrates the operational principle of the particle beam image detector of the present invention.

FIG. 5 illustrates the operational principle of the particle beam image detector of the present invention.

Electrons e⁻ produced through ionization of the gas by the incident particle beams drift under the force of a drift field toward a pixel in the form of an anode electrode 12. In the vicinity of the columnar anode electrode 12, by virtue of the presence of a strong electric field formed by a voltage between anode and cathode (e.g., 420 V) and the pointed shape of electrode, gas avalanche amplification of electrons occurs. The positive ions thus generated quickly drift toward strip-shaped cathode electrodes 14 surrounding and spaced from the columnar anodes 12.

In the course of the above process, electric charges are generated on the columnar anode electrodes 12 and also on the strip-shaped cathodes 14, and these electric charges are observable on the electric circuit. Therefore, determination of the anode or cathode strip at which this amplification phenomenon occurs provides information about the position of the incident particle beam. Means for reading out of signals, circuit design for obtaining two-dimensional images, etc. can be those developed for conventional MSGC.

Advantages of the particle beam image detector of the present invention are summarized as follows:

(1) Since pixels are used as anodes, strong electric fields can be easily formed, leading to enhancement of the amplification factor.

(2) Since each cathode surrounds a corresponding anode in a circular fashion, the electric field at the peripheral portion of the cathode is much weaker than that observed at the anode. As a result, discharge of electrons from the cathode is suppressed.

(3) The electric field between the anode and cathode weakens sharply as a function of distance. Therefore, progress toward discharge occurs only in rare cases.

(4) Between the anode and cathode, an insulator is provided as a substrate. Since the width of the anode strip is larger than the diameter of the aperture of the strip-shaped cathode electrode, and the thickness of the substrate is similar to the radius of the aperture, the direction of the line of electric force is always upward (away from the anode strips) at the insulator surface, eliminating any risk of generating an undesired electrostatic field caused by accumulation of positive ions generated through gas amplification.

(5) Since the present particle beam image detector essentially uses techniques for fabricating printed circuit boards, detectors of large area can be produced at low cost.

(6) In the event of discharge, the detector is not fatally damaged. That is, the only damage the detector would suffer is local breakage (of some pixels).

(7) Since the detector operates under application of voltage to only two terminals, i.e., an anode electrode and a drift electrode, minimum facilities in terms of power supply and wiring are required.

(8) The detector of the invention has the same advantages as those of MSGC. That is, the inventive detector attains a large gain and has improved reliability of electrodes.

Figure 6:
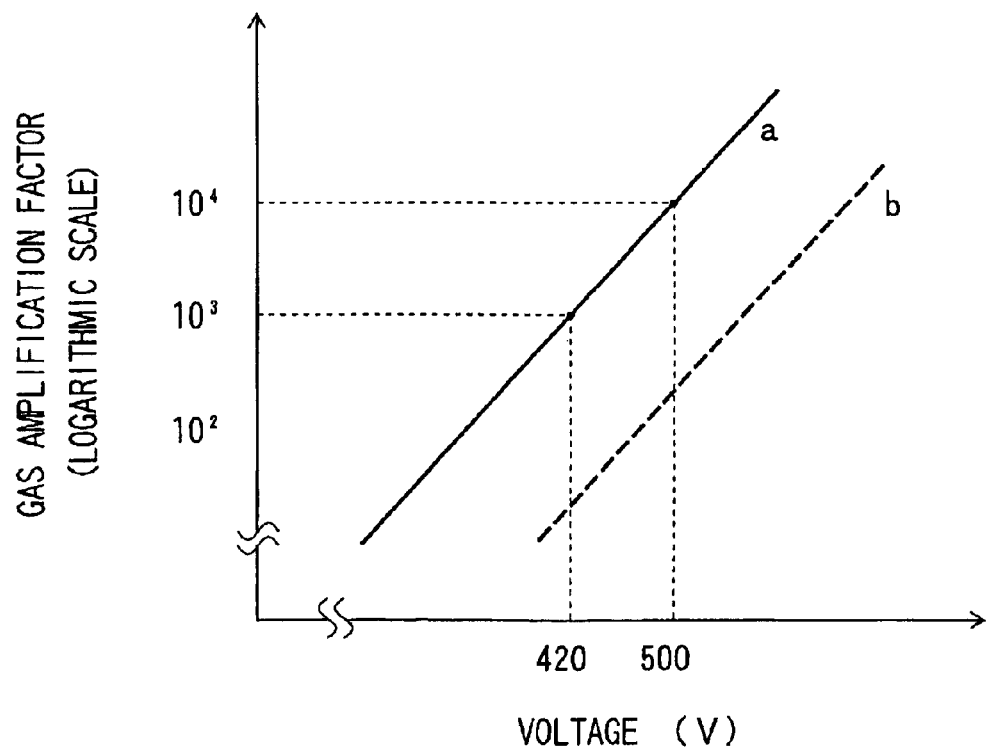
FIG. 6 shows the relationship between voltage applied and gas amplification factor attained by the particle beam image detector of the present invention.

FIG. 6 shows the relationship between voltage applied versus gas amplification factor attained by the particle beam image detector of the present invention. In FIG. 6, the x-axis represents voltage (V) applied between the cathode and the anode, the y-axis represents gas amplification factor (logarithmic scale), line "a" represents a characteristic curve according to the present invention, and line "b" represents that obtained from a conventional detector.

As is apparent from FIG. 6, an amplification factor of about 10,000 can be attained by the present invention. Also, when the detector of the present invention was operated for two days continuously at an amplification factor of about 1,000, there was not even a single occurrence of discharge. At higher amplification factors, discharge was observed, but only rarely, with no subsequent operational problems.

Although the present invention has been described above with reference to specific embodiments, the invention is not limited to those embodiments. Numerous modifications and variations of the present invention are possible in light of the spirit of the present invention, and they are not excluded from the scope of the present invention.

The particle beam image detector according to the present invention employing gas amplification attained by pixel-type electrodes is suitable for use in various technical fields involving detection of radioactive rays;

i.e., monitoring of radioactive rays, X-ray image analysis, medical X-ray imaging, and new techniques of gamma-ray imaging.

What is claimed is:

1. A particle beam image detector employing gas amplification attained by pixel-type electrodes, comprising:

(a) anode strips formed on one surface of a double-sided substrate, (b) columnar anode electrodes which are joined to the anode strips and extend through the double-sided substrate so as to be exposed at a surface thereof, and (c) strip-shaped cathode electrodes each having an aperture receiving one columnar anode, each aperture having a radius similar to the thickness of the said substrate, and each aperture having a diameter smaller than the width of one of said anode strips so that the direction of the line of electric force is always perpendicular to said one surface, eliminating any risk of generating an undesired electrostatic field by accumulation of positive ions generated through gas amplification.

2. The particle beam image detector as recited in claim 1, wherein each of the anode strips has a width of about 200 to 400 $\mu$m.

3. The particle beam image detector as recited in claim 1, wherein the anode strips are provided at intervals of about 400 $\mu$m, the strip-shaped cathode electrodes each have apertures at intervals of a predetermined distance, the diameter of the aperture being about 200 to 300 $\mu$m, and each of the columnar anode electrodes has a diameter of about 40 to 60 $\mu$m and a height of about 50 to 150 $\mu$m.

4. The particle beam image detector as recited in claim 1 further comprising a planar drift electrode facing, parallel to and spaced from said substrate.

5. The particle beam image detector as recited in claim 4 wherein voltage is applied only to the anode strips and to the drift electrode.

6. The particle beam image detector as recited in claim 5 wherein the cathode electrodes are oriented perpendicular to the anode strips.

7. The particle beam image detector as recited in claim 6 wherein the cathode electrodes are formed on a second surface of said substrate, opposite the one surface.

8. The particle beam detector as recited in claim 7 wherein the columnar anode electrodes extend from the anode strips a distance approximating the thickness of said substrate.

9. The particle beam image detector as recited in claim 1 wherein the cathode electrodes are oriented perpendicular to the anode strips.

10. The particle beam detector as recited in claim 1 wherein the columnar anode electrodes extend from the anode strips a distance approximating the thickness of said substrate.

11. The particle beam image detector as recited in claim 10 wherein the cathode electrode are formed second surface of said substrate, opposite the one surface.

12. The particle beam image detector as recited in claim 1 wherein the cathode electrodes are second surface of said substrate, opposite the one surface.

\* \* \* \* \*

UNITED STATES PATENT AND TRADEMARK OFFICE
CERTIFICATE OF CORRECTION

PATENT NO. : 6,822,239 B2
DATED : November 23, 2004
INVENTOR(S) : Tanimori et al.

It is certified that error appears in the above-identified patent and that said Letters Patent is hereby corrected as shown below:

Column 6,
Lines 11 and 18, after "beam" insert -- image --;
Line 24, after "formed" insert -- on a --;
Line 27, after "are" insert -- formed on a --.

Signed and Sealed this

Twenty-fifth Day of April, 2006

JON W. DUDAS
*Director of the United States Patent and Trademark Office*